May 5, 1964     E. R. BROOKE     3,132,333
PROGRAM RINGER

Filed Sept. 6, 1961                         6 Sheets-Sheet 1

Inventor:
EDRIC RAYMOND BROOKE

By Squire + Olcott
Attorneys.

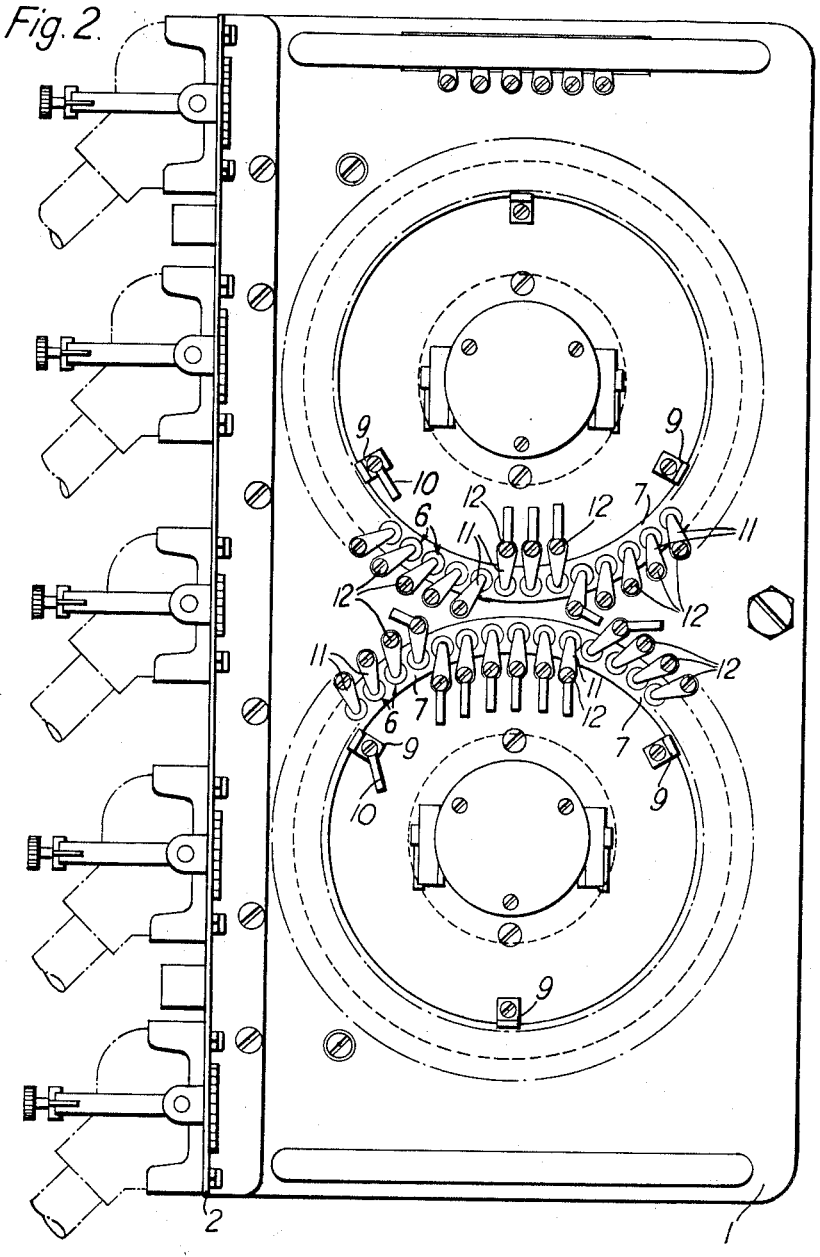

May 5, 1964  E. R. BROOKE  3,132,333
PROGRAM RINGER

Filed Sept. 6, 1961  6 Sheets-Sheet 3

Inventor:
EDRIC RAYMOND BROOKE

By
Squire + Olcott
Attorneys

Inventor:
EDRIC RAYMOND BROOKE
By
Squire - Olcott
Attorneys.

May 5, 1964  E. R. BROOKE  3,132,333
PROGRAM RINGER

Filed Sept. 6, 1961  6 Sheets-Sheet 6

Inventor:
EDRIC RAYMOND BROOKE

By
Squire & Olcott
Attorneys.

3,132,333
PROGRAM RINGER
Edric Raymond Brooke, 10 Garth Close,
Kingston, Surrey, England
Filed Sept. 6, 1961, Ser. No. 136,339
5 Claims. (Cl. 340—345)

This invention concerns electrical signalling apparatus and has for its object the provision of cyclic counting apparatus capable of producing a sequence of electrical signals marking off predetermined intervals that are selected numbers of time units in length, the time units being either true time units (e.g. hours, minutes, seconds or fractions thereof) or arbitrary time units that are, for instance, impulses or actuations resulting from functions of the cycle period of a cyclic process or apparatus operation and vary in spacing in accordance with the actual rate of such process or apparatus operation.

Cyclical counting apparatus capable of producing a sequence of electrical signals marking off intervals of selected numbers of true time units are sometimes called "programme ringers" and for convenience this term will be used herein as descriptive of such apparatus and also as descriptive of apparatus capable of producing a sequence of electrical signals marking off intervals of selected numbers of impulses or arbitrary time units.

It will be readily understood that a programme ringer in which the signals are produced by co-operation between a moving brush and selected members of a bank of contacts equal in number to the number of time units in the time-span of the sequence is necessarily cumbersome and potentially unreliable (owing to the large number of contacts involved) when the required sequence has a long time-span and includes a large number of signals which are to mark off intervals that are accurate in terms of small time units. For instance, a programme ringer that is required to produce a sequence of, say, 100 signals in a week, the signals marking off intervals of any desired length accurate to within one minute, would need a bank of 10080 contacts since there are that number of minutes in a week. Such an arrangement would be altogether too cumbersome for practical use and programme ringers capable of fulfilling this quite modest requirement have, as so far known or proposed, all been of an extremely complex and costly construction.

A programme ringer in accordance with this invention comprises at least two detectors adapted cyclically to sweep associated sets of selection elements synchronously in step-by-step sequence, the numbers of elements in said sets having no common factor, and means for producing a signal in response to simultaneous co-operation between each detector and a selected selection element in its associated set.

In its simplest form, a programme ringer in accordance with the invention has two detectors and two sets of selection elements; since the detectors synchronously sweep the elements in each set in step-by-step sequence it can be shown that, starting from an initial condition in which each detector co-operates with any particular selection element in its associated set, each detector will have to make a number of steps equal to the product of the numbers of elements in the two sets before the detectors again simultaneously co-operate with the said particular selection elements.

Thus, for example, if there are three selection elements in one set and four elements in the other set, synchronous step-by-step sweeping of these sets by the detectors will bring the latter successively into simultaneous co-operation with pairs of elements in the following sequence:

1/1; 2/2; 3/3; 1/4; 2/1; 3/2; 1/3; 2/4; 3/1; 1/2; 2/3; 3/4; 1/1

Thus there are $(3 \times 4) = 12$ discrete element combinations that are defined in sequence by simultaneous co-operation with the detectors as these synchronously and cylically sweep the two sets of elements.

From the foregoing it will be apparent that with three detectors and three sets of selection elements the number of three selection element combinations sequentially defined by simultaneous co-operation with the detectors will be the product of the numbers of elements in the sets thereof provided that said numbers have no common factors; in general, the number of such discrete combinations is $(a \times b \times c \times d \times \ldots)$ providing $a$, $b$, $c$, $d$ etc. all have no common factor.

Thus it will be seen that a relatively small number of selection elements divided into two or more groups can be used to produce a very large number of signals in a long time-span sequence marking off intervals that are accurate with respect to small time units. For instance, a programme ringer in accordance with this invention having two detectors making one step per minute in sweeping sets of selection elements having, respectively, 45 and 224 or 32 and 315 elements, will define one discrete element combination simultaneously co-operating with the detectors each successive minute of a week, so that such a programme ringer can produce a sequence of any number (up to 10080) of signals marking off intervals accurate to one minute in a week and repeat such sequence to produce signals at the same time each week.

The detectors and selection elements may take any mutually compatible form. For instance, the detectors may be brushes that sweep sets of contacts, or more sophisticated devices may be employed.

Thus, in an embodiment of the invention hereinafter described the detectors and selection elements are photo-cells and lamps respectively, whilst other possible forms for the detectors and selection elements include electric or magnetic field-sensitive devices and electric or magnetic field-generating devices, as appropriate.

The sweeping of the selection elements by the detectors may be brought about in any convenient manner; the selection elements may be stationary and be swept by moving detectors or the detectors may be stationary and sweep moving sets of selection elements, the particular arrangement chosen being a matter of convenience and dependent to a certain extent upon the nature of the selection elements and the detectors; usually it will be desirable to adopt an arrangement giving rise to the least number of rubbing contacts.

For certain purposes, particularly for machine or process control purposes, it may be desirable to have two or more detectors sweeping an individual set of selection elements, the detectors co-operating, at any instant, with different members of the set of elements.

Selection amongst the detectors co-operating with a set of elements may be accomplished in any suitable manner; for instance such selection may be achieved with the aid of appropriate switching arrangements operating in harmony with the sweeping of the elements by the detectors or in accordance with a programme determined by a suitable programming device, which could, if desired, comprise an ancillary programme ringer in accordance with the invention.

Two embodiments of the invention will now be described, together with certain process and machine control applications thereof, by way of example and with reference to the accompanying draws, in which:

FIGURE 2 is a front elevational view of the programme ringer of FIGURE 1;

Figure 1:
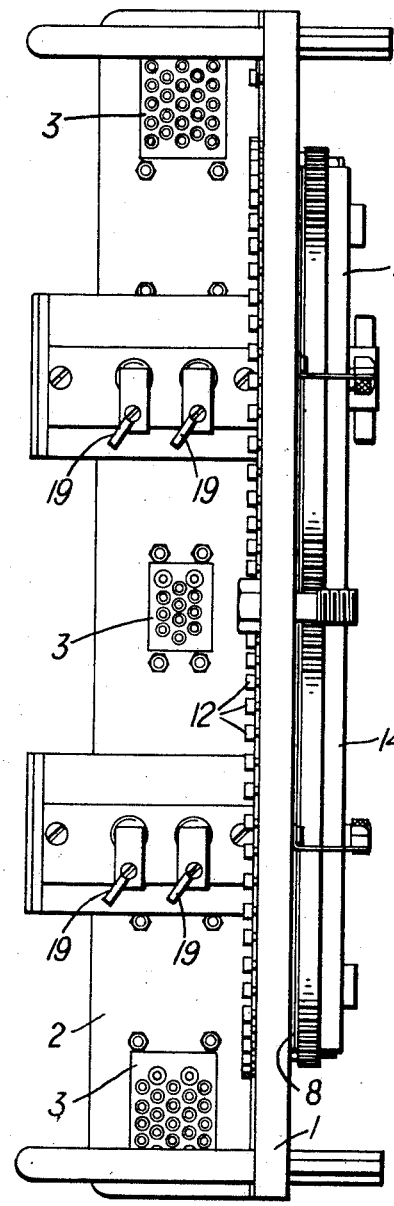
FIGURE 1 is a side elevational view of a programme ringer constructed in accordance with one embodiment of the invention.
Figure 5:
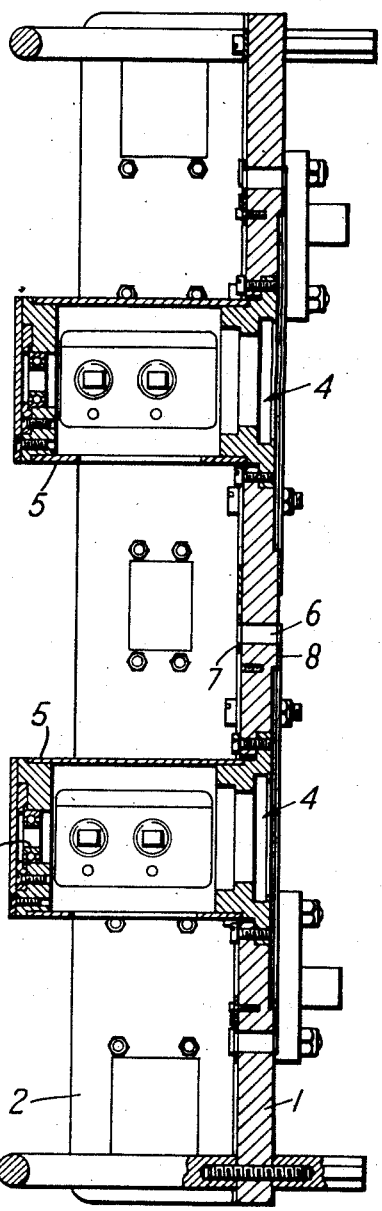
FIGURE 5 is a section on line V—V of FIGURE 4, the detectors and their carriers also being omitted in this view.
Figure 3:
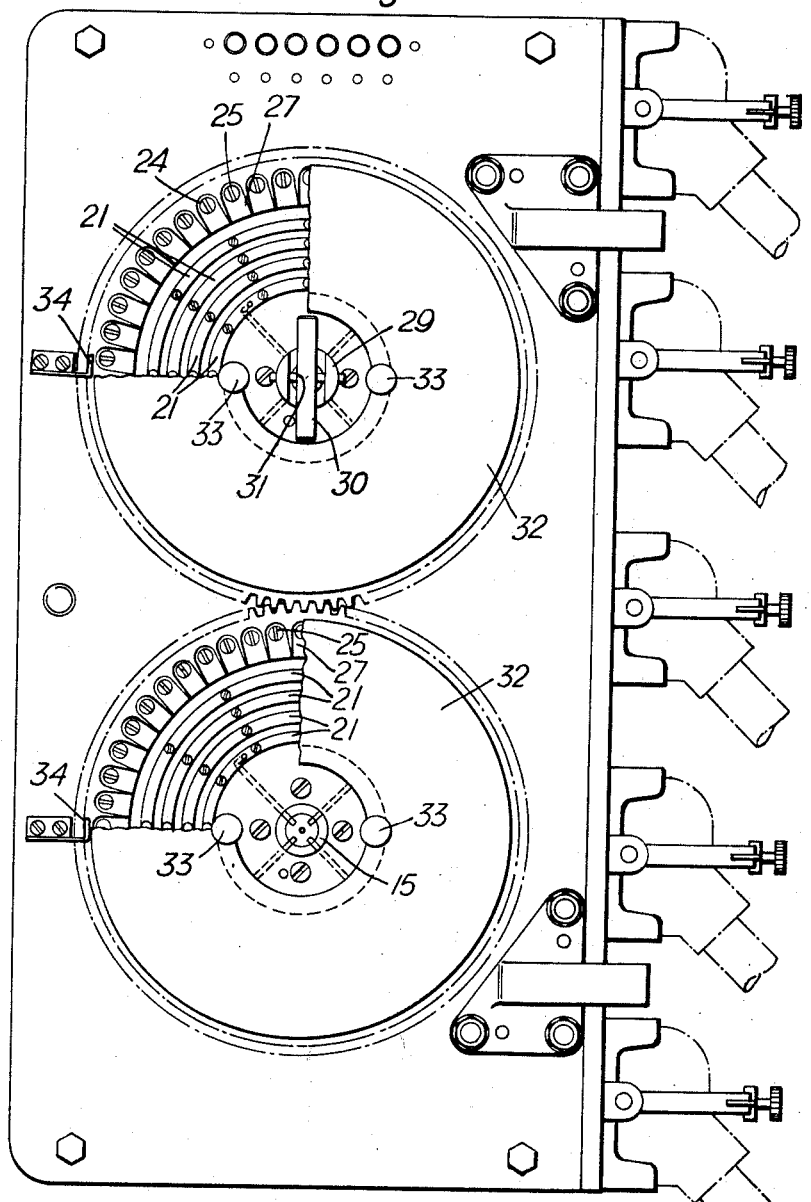
FIGURE 3 is a rear elevational view of the programme ringer of FIGURE 1, with parts broken away to show internal details.
Figure 4:
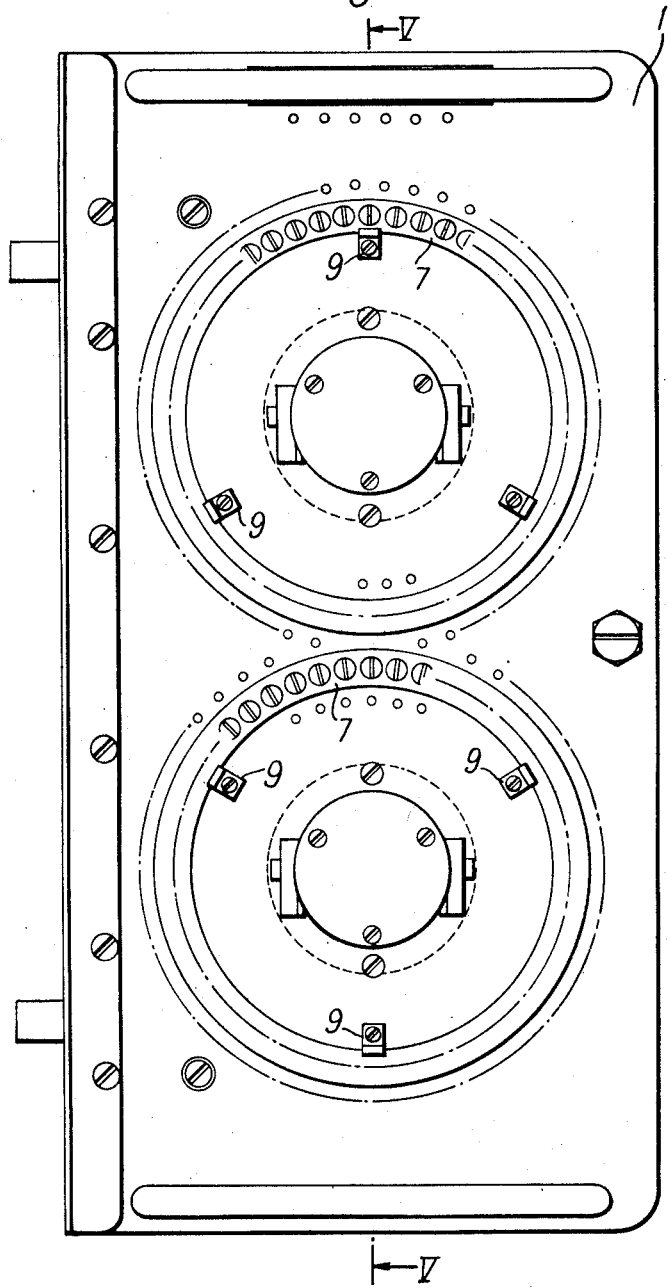
FIGURE 4 is a view corresponding with FIGURE 2 but omitting the selection elements and their connections.
Figure 7:
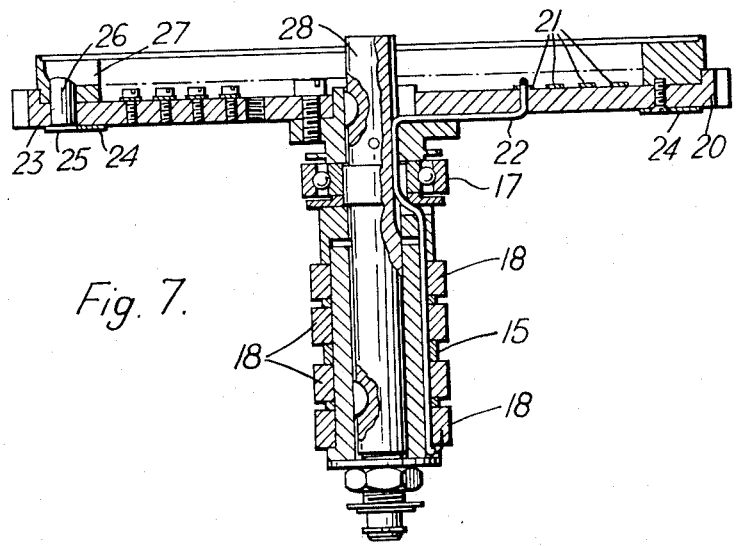
FIGURE 7 is a section on line VII—VII of FIGURE 6.
Figure 6:
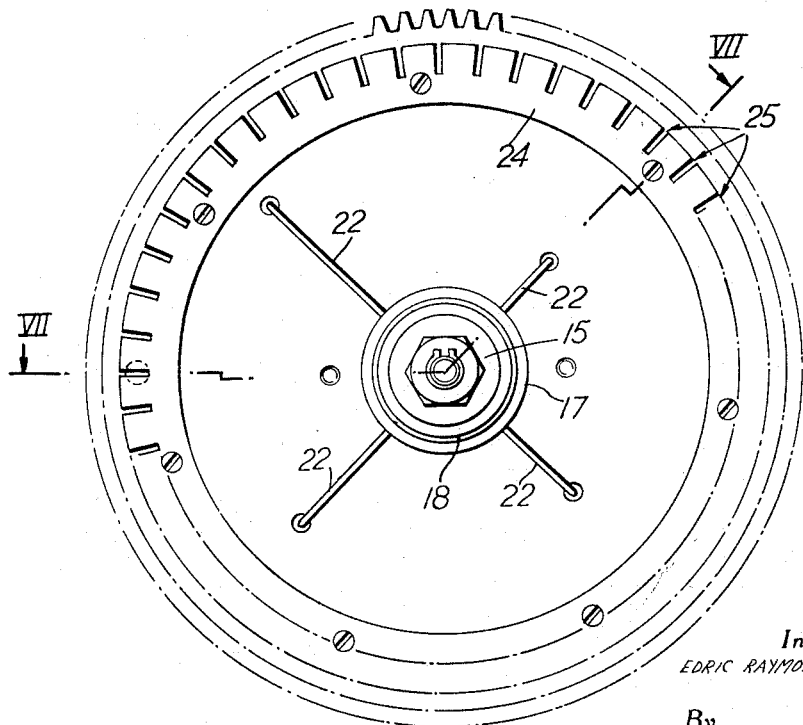
FIGURE 6 is a front elevational view of a detector carrier of the programme ringer of FIGURES 1 to 3.

The programme ringer illustrated in FIGURES 1 to 7 of the drawings is particularly designed for use in a process or machine control system to produce control signals at predetermined instants in operation of such process or machine for the purpose of regulating the continuance of such process or machine operation.

Thus this programme ringer is especially intended for use in the control of a knitting machine, for producing course termination signals at predetermined instants in the operation of the machine thereby to determine the length of successisve courses of the knittted fabric produced by the machine in accordance with a desired programme or pattern. Thus, for this purpose, the programme ringer produces a sequence of signals which mark off intervals having lengths measured in arbitrary time units that are functions of the operating speed of the knitting machine. However, with little or no modification it could be adapted for other purposes and by the use of a drive unit governed by true time it could function as a conventional programme ringer to produce a sequence of signals marking off intervals having lengths measured in true time units.

The illustrated programme ringer comprises a chassis in the form of a rectangular plate 1 of electrically-insulating material having along one edge an attached flange 2 on which are mounted connectors 3 in leads coupling the selection elements of the apparatus to a programming device (not shown).

The plate 1 has two circular apertures 4 over which detector carrier bearing and brush-gear housings 5 are mounted. Each aperture 4 is surrounded by a concentric ring of holes 6 that receive electric lamps constituting the selection elements. The lamps are retained in each ring of holes 6 by means of correspondingly perforated rings 7, 8, overlying the front and rear surfaces of plate 1, the ring 7 co-operating with the cap of each lamp and constituting a common return connection for the lamps, this ring being secured by clips 9 one of which has a return lead 10 connected thereto. The centre terminals of the lamps are engaged by contact blades 11 mounted on plate 1 by screws 12 adjacent to holes 6, each blade 11 having an individual lead for connection to the programming device via connectors 3. Only a few of the leads are shown in FIGURE 2, for the sake of clarity.

In this embodiment of the invention, the two sets of selection elements constituted by the lamps in the rings of holes 6 consist of 48 and 49 elements respectively so that with a single detector sweeping each set in synchronism as discussed hereinabove, there will be $$(48 \times 49) = 2352$$

discrete combinations of elements successively defined by simultaneous co-operation with the detectors. However, in this embodiment there is provision for more than one detector to sweep each set of selection elements and for selection of individual detectors or of combinations of detectors from the detectors sweeping each said set, thereby to provide, effectively, a much greater number of discrete combinations of elements successively defined by simultaneous co-operation with selected detectors or detector combinations.

Thus, the illustrated programme ringer further comprises a pair of detector carriers 13, 14 having centre posts 15 that project through the apertures 4 in plate 1 and extend into the housings 5; each of said housings has an anti-friction bearing 16 for the end of the associated post 15 whilst the latter also runs in an anti-friction bearing 17 (see FIGURE 7) in the end of the housing 5 adjacent to plate 1.

Between the bearings 16, 17, each centre post carries four mutually insulated slip rings 18 that cooperate with brushes (not shown) in the housings 5, these brushes being arranged in pairs on opposite sides of each housing and being connected to individual leads 19. Each centre post 15 carries a gear and ring assembly, that of the carrier 13 being illustrated in FIGURES 6 and 7. This assembly comprises a disc 20 of electrically insulating material the periphery of which is formed as a spur gear having a number of teeth equal to a multiple of the number of selection elements in the set with which the detector(s) of the carrier co-operate; in the case of carrier 13 there are $(2 \times 49) = 98$ teeth on the disc 20, whilst carrier 14 has $(2 \times 48) = 96$ teeth on the periphery of its disc 20.

The rear face of the disc 20 carries four concentric conductive rings 21 that are connected to individual slip rings 18 on the centre post by leads 22 that extend through a central bore and longitudinal passages in the centre post 15.

The periphery of disc 20 overlies the ring of holes 6 locating the lamps constituting the selection elements and is formed, in the case of carrier 13, with 49 equally spaced bores 23 that register with the holes 6. The front face of disc 20 carries a masking ring 24 that overlies the bore 23 and has radial slits 25 that intersect the centre-lines of bores 23. The rear face of the disc 20 carries a carrier ring that is formed with bores registering with bores 23 in the disc and, on its rear face, with semicircular section radial recesses 27 in which detectors in the form of photo-transistors may be seated over the rear ends of bores 26 as required, the connections of these transistors being made to selected rings 21.

The carrier 13 is adapted for coupling to a suitable drive unit (not shown) which causes step-by-step rotation of the carrier by consecutive angular amounts corresponding to the pitch of bores 23, 26 so that any particular bore 23 in disc 20 is brought into register with successive holes 6 in the ring thereof in front of the disc 20. The drive unit may, for instance, comprise an electromagnetically-operated ratchet and pawl device such as used for driving rotary line switches.

Thus a drive shaft 28 extends into the bore of the centre post 15 of carrier 13 and is keyed or otherwise fixed to the centre post so that rotation of shaft 28 causes rotation of the carrier. The rear end of shaft 28 carries a fork fitting 29 (see FIGURE 3) and a transverse coupling pin 30 lies between the arms of fitting 29 and is loosely transfixed by cross pin 31 extending through the fitting arms and intersecting the axis of shaft 28. The coupling pin 30 may thus be engaged by a suitable coupling fork on the output shaft of the drive unit.

The rear of the disc 20 around the coupling pin is closed by a detachable cover 32 secured to the disc 20 by thumb screws 33.

The construction of the carrier 14 is substantially the same as that of the carrier 13, differing only in that its disc 20 has $(2 \times 48) = 96$ peripheral gear teeth and is formed with 48 bores 23, whilst its carrier ring has 48 registering bores 26. Also, the carrier 14 does not have a coupling shaft 28 since it is driven by the carrier 13, the peripheral gear teeth on the two carriers meshing so that any particular bore 23 of the disc 20 of carrier 14 moves, step-by-step, into register with successive holes 6 in the ring thereof in front of this carrier, in synchronism with the movement of the bores 23 in carrier 13 into register with the holes 6 in the ring thereof in front of that carrier.

For convenience in ascertaining the relative positions of the two carriers at any instant and for selecting the recesses in their carrier rings to receive photo-transistors, the carrier rings are engraved on their peripheries with numbers indicative of successive steps in their rotations, and the plate 1 carries index pointers 34 adjacent to these engraved numbers on the carrier rings.

The operation of the illustrated programme ringer is most readily understood by consideration, first, of an arrangement in which each of the carriers 13, 14, is equipped with a single photo-transistor. With such an arrangement, the energization of a particular lamp in each of the two rings of holes 6 will result in a response by the photo-transistor in either carrier each time, during the rotation of the carriers, that the bore 23 overlaid by the photo-transistor of such carrier comes into register with the hole 6 housing the energized lamp. There will thus be one such response per revolution of each carrier but the responses for the two carriers will only occur simultaneously at intervals corresponding with $$(48 \times 49) = 2352$$

steps of rotation of the carriers.

Simultaneous responses by the two photo-transistors may be utilised to produce an output signal in any convenient manner. A suitable arrangement comprises a gating circuit that permits an output pulse to pass on receipt of simultaneous responses by the circuit but which blocks such output pulses in the absence of a photo-transistor response and also on receipt of an individual response from either of the photo-transistors.

It will be understood that if more than one pair of lamps in holes 6 is energized simultaneously, the number of occasions, during 2352 steps of carrier rotation, on which the two photo-transistors will respond simultaneously is $N^2$ where N is the number of energized pairs of lamps and it would be fortuitous if the individual signalling instants in a desired sequence of signals coincided with all the occasions upon which simultaneous responses occurred as a result of the two photo-transistors each sweeping a number of energized lamps equal to the square root of the number of signals in the sequence.

Accordingly it will usually be ecessary to arrange for each successive signal to cause de-energization of the pair of lamps giving rise to such signal and to cause energization of the appropriate pair of lamps for production of the next signal in the sequence.

This function may be performed by any suitable device such as a sequence switch that in successive positions sets up the connections for energizing the required pairs of lamps and which is advanced from one position to the next by each successive signal. A sequence switch could be used to set up the desired connections in a direct manner or, to facilitate remote installation of the switch, the switch could be arranged to control the relays of a relay decoder that energizes pair of lamps in accordance with combinations of operated relays set up in successive positions of the switch.

Arrangements making use of devices such as the sequence switch discussed above are suitable when the programme ringer is to produce a sequence of relatively few signals and to repeat this sequence a large number of times, for instance during each operating cycle of a machine. However, when, as in the control of certain machine operations such as in the control of course termination in a knitting machine, a selected sequence may have to be changed frequently, it will usually be more convenient to employ a more versatile programming device.

Particularly convenient programming devices for such circumstances comprise a reading unit that can convert information, preferably in coded form, on a suitable record medium into energizations of appropriate pairs of lamps in the holes 6. The record medium may be a perforated strip, band or card in which the perforations therein, individually or in groups, are significant of pairs of lamps to be successively energized and the reading unit may be of any form capable of sensing the successive perforations or perforation groups and of providing an output that causes, directly or indirectly, energization of the appropriate pairs of lamps. Alternatively, the record medium may be a wire, tape, band or drum that is magnetized in a manner characteristic of successive pairs of lamps to be energized whilst the reading unit comprises a suitable transducer device. In either case the reading unit will be caused to scan the record medium in step with the production of signals by the programme ringer.

As mentioned, a programming device having a form such as described above preferably utilizes coded information on the record medium and incorporates a suitable decoder that translates such information into an output that can be utilized to cause energization of the appropriate pairs of lamps. For instance, the information on the record medium may be coded in binary digital form as, for example, in the Baudot teleprinter code, and this coded information converted by the reading unit into corresponding combinations of operated relays in relay decoder that controls the energization of the lamps in holes 6.

As noted in the description of the carriers 13, 14, each of the carriers can be equipped with more than one photo-transistor, these being located in different recesses 27 and being connected to different rings 21; up to three photo-transistors can be accommodated in each carrier with individual connections via rings 21 and slip rings 18 to external circuitry. By the use of two or three photo-transistors in one or both carriers and by selecting a different pair of photo-transistors for co-operation with the gating circuit (or other means producing a signal upon simultaneous response by a pair of photo-transistors), the equivalent of a phase-shift of the sequence cycle can be obtained. This is of particular use in the application of the invention to a knitting machine as herein described. Alternately the same sequences of signals, but differently phased, can be produced in different output channels each having a gating circuit or other means co-operating with an individual pair of photo-transistors. In certain circumstances it may be advantageous to provide linking circuits between the said different output channels so that the sequence of signals in one of the channels can be modified by chosen signals from the other channel or channels.

As noted, the illustrated programme ringer is intended for the control of course termination in a knitting machine and for this purpose the step-by-step rotation of the carriers is co-ordinated with the operation of the machine in knitting a course and each output signal is adapted to cause course termination.

Moreover, this particular programme ringer is intended for use in conjunction with knitting machines of the kind having a reciprocating cam box that during each stroke causes the machine to knit a pair of successive courses, the second course of such pair being commenced shortly after the commencing of knitting of the first course of the pair; that is, each stroke of the cam box causes two successive knitting operations on each needle, the two operations on any one needle being spaced in time by the time required for a selected number of operations on successive needles to occur. This time lag may, for instance, be equal to the time for operation on twenty successive needles, in which case each stroke of the cam box produces operation on the first twenty needles in succession and thereafter simultaneous operation on the twenty-first and first needles followed by simultaneous operation on the twenty-second and second needles and so on.

Accordingly, for each stroke of the cam box, two course termination signals are required, one for the first and the other for the second course of the pair of courses knitted by such stroke. The provision of three photo-transistors in at least one of the carriers 13, 14, enables such signals to be produced, when required, in a most convenient manner when the machine is to knit a number of courses of the same length.

Thus, when such a machine is to knit a series of courses of the same length, the programming device associated with the programme ringer may be adapted to energize a single lamp in each ring of holes 6 for each stroke of the cam box, and each carrier be provided with three photo-transistors so disposed that during the cam box stroke concerned the "leading" photo-transistor in each carrier (for the direction of rotation thereof related to the cam box stroke direction) registers with the energized lamp in its associated ring when termination of the first course of the pair is required, whilst the "middle" photo-transistor in each carrier registers with such lamp when termination of the second course of the pair of is required. The "trailing" photo-transistor in each carrier, during the cam box stroke considered above, is idle but is so disposed as to provide the "first" course termination signal on the succeeding return stroke of the cam box (when such photo-transistor becomes the "leading" one owing to the change in cam box stroke direction and carrier rotation), the "middle" photo-transistor acting, as before, to provide the "second" course termination signal during such cam box return stroke. Because the "middle" photo-transistors in such arrangement always produce the "second" course termination signal, such signal can additionally be utilized to perform other control functions such as initiating the change of cam box stroke direction and/or operating switching means to transfer the functions of the previously "leading" photo-transistors to the previously "trailing" photo-transistors in readiness for the next stroke of the cam box.

It will be apparent that the programme ringer shown in FIGURES 1 to 7 could be adapted to other process or machine control purposes, for instance for controlling the operation of a loom in producing patterned fabric or carpet.

It has been pointed out above that the above-described programme ringer will usually require to be associated with an ancillary device for energizing, at the time of each signal, the pair of lamps appropriate to the next signal in the sequence.

However, this requirement could be avoided by transposition of the lamps and photo-transistors, i.e. by fitting one or more lamps in each carrier and by substituting photo-transistors or equivalent devices for the lamps in holes 6. Then, by providing a number of circuits, such as gating circuits, capable of producing an output signal on receipt of two simultaneous input signals from the photo-transistors or equivalent devices with each such circuit wired to a pair of such devices (one in each ring) that are simultaneously illuminated by carrier-borne lamps at the instants output signals are required, continuous energization of such lamps will result in the production of a desired sequence of output signals.

Such a modification, whilst requiring a large number of photo-transistors or equivalent devices and a number of circuits equal to the number of required signals in a particular sequence, nevertheless could be considerably less complex and more reliable than prior art programme ringers of equivalent versatility and additionally, because each output signal originates in an individual circuit, can be adapted to provide sequences including individually distinguishable signals.

The above-described embodiment could also be modified in a variety of other ways, more particularly by the substitution of different forms of detector and selection element. For instance, the lamps in holes 6 could be replaced by coils or other inductors which when energized set up magnetic fields to be sensed by magnetic field-sensitive detectors. Alternatively, the holes 6 could house stud contacts and the detectors be constituted by wiping contacts in the bores 26 of the carriers.

Figure 8:
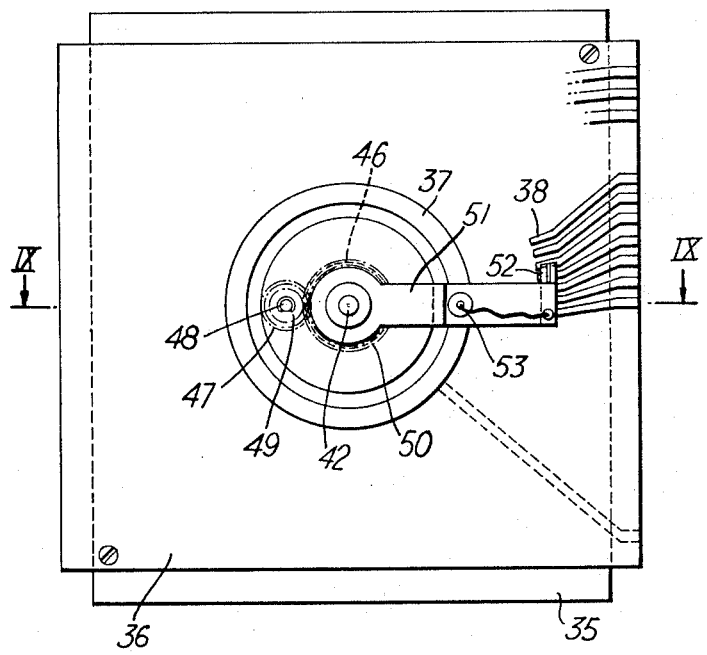
FIGURE 8 is a plan view of a second embodiment of the invention.
Figure 9:
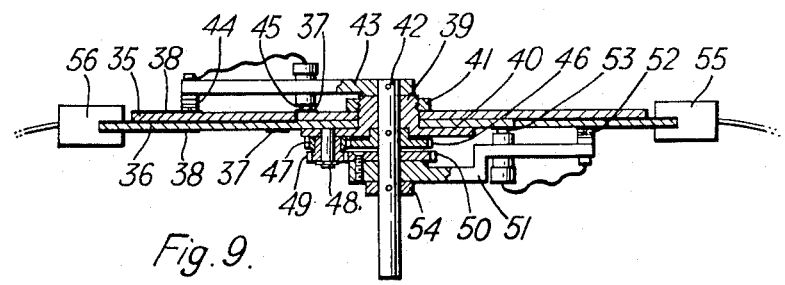
FIGURE 9 is a section on line IX—IX of FIGURE 8.

FIGURES 8 and 9 illustrate a second embodiment of a programme ringer in accordance with the invention, this embodiment having detectors in the form of brushes and selection elements in the form of contacts that are swept by the brushes to establish conductive connections between each brush and the successive contacts swept thereby.

Thus, this second embodiment comprises two electrically-insulating boards 35, 36 each having, on one face, conductive areas constituting a slip ring 37 surrounded by a ring of contacts 38 and connections extending to the board edge, such areas most conveniently being formed by "printed circuit" techniques. The boards 35, 36 are secured together back-to-back so that the rings of contacts 38 are on the outer faces of the board assembly.

The boards 35, 36 are secured together by screws at their corners and by means of a central bushing 39 that has a flange 40 on one side of the assembly and is screw-threaded to receive a threaded collar 41 engaging the opposite side of the assembly. The bushing 39 forms a bearing for a driving shaft 42 that has a radial brush arm 43 of insulating material pinned or otherwise fixed on the end projecting from bushing 39 adjacent to collar 41. This brush arm 43 has a pair of brushes 44, 45 electrically interconnected and disposed to sweep the contacts 38 and slip ring 37 respectively, of board 35.

A pinion 46 is pinned or otherwise fixed to shaft 42 adjacent to bush flange 40 and meshes with a pinion 47 on a stub axle 48 carried by flange 40. A further pinion 49 is integral with pinion 47 and meshes with a fourth pinion 50 rotatable on shaft 42 and which carries a radial brush arm 51 having brushes 52, 53 electrically interconnected and disposed to sweep the contacts 38 and slip ring 37, respectively, of board 36. The pinion 50 is retained in place by means of a collar 54 pinned or otherwise secured to shaft 42.

The numbers of contacts 38 in the two rings thereof have no common factor; thus there may be 48 contacts 38 on board 35 and 49 contacts 38 on board 36. The ratios of the teeth on the pinions 46, 47, 49, 50 are such that an angular movement of shaft 42 to move brush 44 from one contact 38 on board 35 to the next adjacent contact 38 results in angular movement of brush 52 from one contact 38 on board 36 to the next adjacent contact 38. Thus, in the case of an arrangement having 48 and 49 contacts 38 on boards 35 and 36 respectively, pinion 46 may have 48 teeth, pinion 47 may have 24 teeth, pinion 49 may have 23 teeth and pinion 50 may have 49 teeth.

Suitable connectors 55, 56 engaging the edges of boards 35, 36 serve to connect the conductive areas thereon to external circuitry.

It will be understood that with the aforesaid numbers of contacts 38 on the boards 35, 36, 2352 successive steps of rotation of shaft 42 will establish that number of discrete combinations of contacts 38 in engagement, simultaneously, with brushes 44 and 52 and accordingly a series circuit including one particular contact 38 of each board 35, 36 and slip rings 37 will be closed for each 2352 steps of rotation of shaft 42 and such closure may be employed to produce a signal.

Thus successive energization of appropriate pairs of contacts 38 may be utilized to produce a desired sequence of signals in a manner equivalent to that of the embodiment of FIGURES 1 to 7. However, since each required signal in a particular sequence results, in effect, from the closure of a particular series circuit including the brushes and a particular pair of contacts 38, the current that flows upon closure of such circuit to signify such closure may be derived from a source located at any convenient point in the circuit.

For instance, the circuit between the two brushes may include a current source so that simple linking circuits between appropriate pairs of contacts 38 will result in a current flow whenever the brushes simultaneously engage a pair of active contacts 38. This current flow may by itself constitute the desired signal or be adapted to give rise to the desired signal by actuating a signal-producing device, such as a relay, included in the circuit between the brushes.

The arrangement just described has the defect that if one contact 38 on either board 35, 36 happens to be linked to two or more contacts 38 on the other board to produce a corresponding number of signals, spurious signals will also be produced as a result unwanted current paths being established between the brushes for certain positions thereof. However, since all such unwanted current paths include a linking circuit that is traversed by current, for the production of a spurious signal, in the opposite direction to that in which it is traversed in the production of a desired signal, this defect can be overcome by the use of direct current and the inclusion of a suitably orientated rectifier in each linking circuit.

This arrangement also lends itself to the production of individually distinguishable signals in a sequence since it will be apparent that an ancillary signal-producing device can be associated with any selected linking circuit to produce a distinguishing signal when current flows through such linking circuit.

Finally, it should be noted that the embodiment of FIGURES 8 and 9 could be utilized as a programming device associated with the embodiment of FIGURES 1 to 7. Thus, it could be arranged for the brushes of the embodiment of FIGURES 8 and 9 to be advanced from one contact 38 to the next for each signal of a sequence produced by the embodiment of FIGURES 1 to 7, the brushes being connected together to a lamp current source and the contacts 38 being connected in appropriate order to the lamps in holes 6 of the embodiment of FIGURES 1 to 7 to cause energization of pairs of such lamps in the order required for the production of a desired sequence of signals.

I claim:

1. A selection device of the class described, comprising:
   (a) a first circularly arranged regularly spaced series of elements each of which may be independently selectively actuated;
   (b) a second circularly arranged regularly spaced series of elements each of which may be independently selectively actuated, the number of elements in said first series being different from the number of elements in said second series, the number of elements in each series being such that there is no common factor therebetween;
   (c) first sensing means adapted to move successively into register with each of the individual elements of said first series and to furnish a signal in response to any element with which it is in register being actuated;
   (d) second sensing means adapted to move successively into register with each of the individual elements of said second series and to furnish a signal in response to any element with which it is in register being actuated; and
   (e) means coupling said first sensing means to said second sensing means to cause simultaneous successive displacements of both sensing means each from any one of the elements to an adjacent element of its associated series, whereby, when a single element of each series is actuated, simultaneous signals will be furnished by both sensing means at successive intervals, the number of displacements from one element to an adjacent element included in each of said intervals being equal to the product of said numbers of elements.

2. A selection device according to claim 1, wherein the number of elements in said first series is $n$ and the number of elements in said second series is $n+1$.

3. A selection device according to claim 1, wherein each of said elements is a lamp and in which each sensing means is a photosensitive device.

4. A selection device according to claim 1, wherein each of said elements is a stationary contact and in which each of said sensing means comprises a movable contact which engages an individual stationary contact when in register therewith, each element being actuated by energization thereof.

5. A selection device according to claim 1, wherein said means coupling said first sensing means to said second sensing means comprises a plurality of meshing gears.

References Cited in the file of this patent

UNITED STATES PATENTS

| 1,317,109 | Sohm | Sept. 23, 1919 |
| 1,369,146 | Thomas | Feb. 22, 1921 |
| 2,073,812 | Severy | Mar. 16, 1937 |
| 2,622,143 | Boswau | Dec. 16, 1952 |

FOREIGN PATENTS

| 51,311 | Germany | Mar. 27, 1890 |